US010462976B2

(12) United States Patent
Sheedy et al.

(10) Patent No.: US 10,462,976 B2
(45) Date of Patent: Nov. 5, 2019

(54) BALE CUTTING APPARATUS AND METHOD

(76) Inventors: Thomas Sheedy, County Limerick (IE); Nuala Sheedy, County Limerick (IE); Anne O'Connell, County Limerick (IE); Michael Herbert, County Limerick (IE)

( * ) Notice: Subject to any disclaimer, the term of this patent is extended or adjusted under 35 U.S.C. 154(b) by 554 days.

(21) Appl. No.: 13/513,998

(22) PCT Filed: Dec. 7, 2010

(86) PCT No.: PCT/EP2010/069109
§ 371 (c)(1),
(2), (4) Date: Jul. 17, 2012

(87) PCT Pub. No.: WO2011/070037
PCT Pub. Date: Jun. 16, 2011

(65) Prior Publication Data
US 2013/0149082 A1    Jun. 13, 2013

(30) Foreign Application Priority Data

Dec. 7, 2009    (IE) .................................. S2009/0919

(51) Int. Cl.
*A01F 29/00*    (2006.01)
*A01D 87/12*    (2006.01)

(52) U.S. Cl.
CPC .......... *A01F 29/005* (2013.01); *A01D 87/127* (2013.01); *A01D 2087/128* (2013.01)

(58) Field of Classification Search
CPC .............. B02C 19/00; A01D 2807/128; A01D 87/127; A01F 29/005
(Continued)

(56) References Cited

U.S. PATENT DOCUMENTS 2,521,323 A * 9/1950 Baldwin ...................... 83/759
4,411,573 A   10/1983 Townsend
(Continued)

FOREIGN PATENT DOCUMENTS

CA    2273306 A1    11/2000
GB    2289619 A     11/1995
(Continued)

OTHER PUBLICATIONS

Written Opinion of International Searching Authority, PCT/EP2010/069109, dated Oct. 4, 2011.
(Continued)

*Primary Examiner* — Saul Rodriquez
*Assistant Examiner* — Ashley K Romano
(74) *Attorney, Agent, or Firm* — Baker Donelson; Carl Davis

(57) ABSTRACT

The present invention relates to a bale cutting apparatus comprising attachment means for coupling the apparatus to a prime mover and a cutting means to cut through a bale containing fodder. The apparatus has cutting means that is operable to retain the bale against a stop member and cut through the bale such that the fodder is discharged from the bale and any bale covering materials are retained by the apparatus. The present invention eliminates the need to separately remove any covering materials in which the fodder is wrapped.

21 Claims, 13 Drawing Sheets

(58) Field of Classification Search
USPC .... 414/24.5, 412; 83/13, 247, 253, 254, 391
See application file for complete search history.

(56) References Cited

U.S. PATENT DOCUMENTS

| | | | |
|---|---|---|---|
| 4,417,495 A * | 11/1983 | Gordon et al. | ................. 83/175 |
| 4,996,899 A | 3/1991 | Henderson | |
| 5,161,448 A | 11/1992 | Wangsness | |
| 5,544,822 A | 8/1996 | Neier | |
| 2002/0005097 A1 | 1/2002 | Rogness | |
| 2003/0192416 A1 * | 10/2003 | Platon et al. | ................... 83/733 |
| 2008/0041989 A1 | 2/2008 | Schierman | |
| 2008/0159830 A1 | 7/2008 | Haugstad | |

FOREIGN PATENT DOCUMENTS

| | | | | |
|---|---|---|---|---|
| JP | 2006-42688 A | 2/2006 | | |
| JP | 2008-187912 A | 8/2008 | | |
| WO | WO 2006/118469 A1 * | 11/2006 | ............. | B65B 69/00 |
| WO | 2008071856 A1 | 6/2008 | | |
| WO | 2010016045 A1 | 2/2010 | | |

OTHER PUBLICATIONS

Korean Intellectual Property Office, Bale Cutting Apparatus and Method, Korean Patent Application No. 10-2012-7017656, Notification of the Reasons for Rejection, dated May 22, 2107.
F.F. Gorman & Co., Notes for preparation of response to first official letter in (Bale Cutting Apparatus and Method) Korean Patent Application No. 10-2012-7017656 (dated 2017).
Korean Patent Application No. 10-2012-7017656, Bale Cutting Apparatus and Method, Response to first official letter (dated Jul. 24, 2017).
Korean Patent Application No. 10-2012-7017656, Bale Cutting Apparatus and Method, Notice of Allowance and Additional Search Report (dated Nov. 16, 2017).
Korean Patent Application No. 10-2012-7017656, Bale Cutting Apparatus and Method, allowed claims.
European Patent Application 10 798 748.9-1656, Bale Cutting Apparatus and Method, Notice of intention to grant Europen patent (dated Sep. 5, 2017).
European Patent Application 10 798 748.9-1656, Bale Cutting Apparatus and Method, allowed claims (dated Sep. 5, 2017).

* cited by examiner

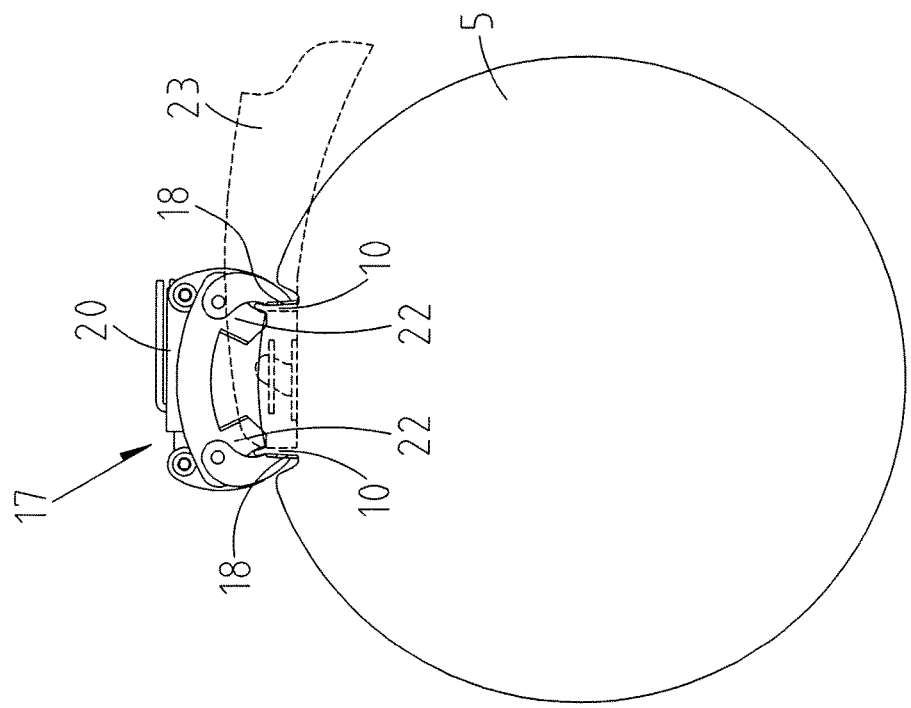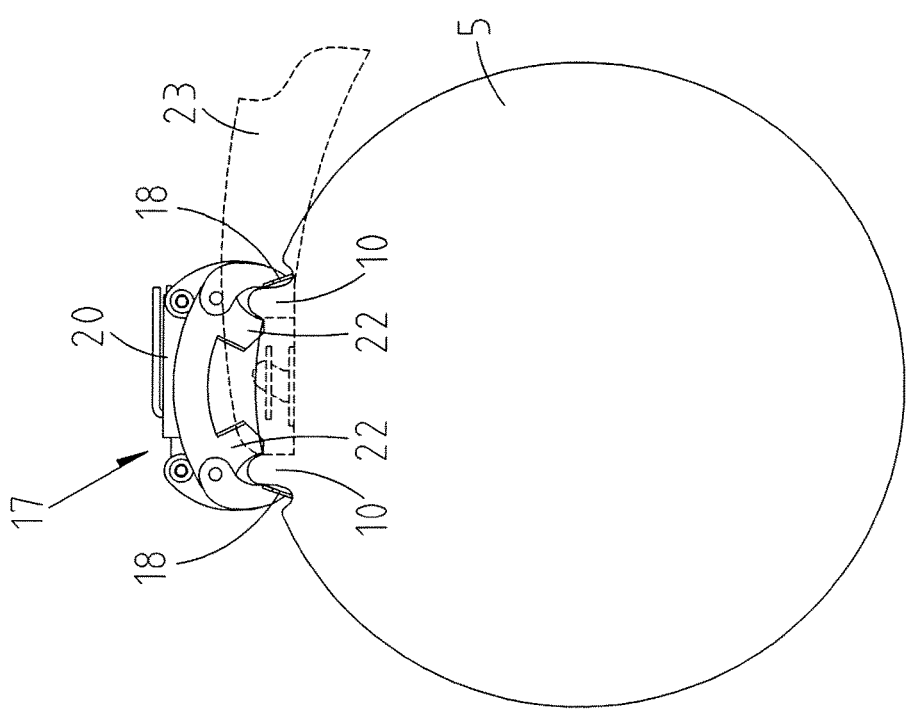

BALE CUTTING APPARATUS AND METHOD

The present invention relates to a bale cutting apparatus and method. Fodder is wrapped in large bales which are covered in layers of wrapping materials to hold the bale together and/or to protect the contents from contact with air. Various types of apparatus are used for handling these bales including bale spikes, bale grabs and other handling apparatus.

A major problem with the handling of bales is that the outer bale covering materials, which are typically plastics coverings, and any inner covering, such as plastic meshing, net wrap, string or twine, must all be removed before the fodder is fed to animals either directly along a feeding passageway in a slatted shed or if fed using a feeding wagon. This is a particular problem because if the plastics material goes into the feeding wagon it may become entangled into the mixing apparatus or get chopped into small pieces and distributed with the animal feed which could lead to catastrophic consequences.

In practice, a tractor operator will typically be required to leave the cab of the tractor in order to cut and remove the wrappings from around a bale, and this is not only time consuming but also dangerous since the operator is entering an extremely hazardous environment in which engagement with heavy machinery is required. Moreover, the resulting smell and odour of the silage on an operator's shoes and clothing after completing such a task is extremely unpleasant.

The object of the invention is to provide a wrapped bale handling apparatus which alleviates the above disadvantages.

Accordingly, the present invention provides a bale cutting apparatus of the type comprising attachment means for coupling the apparatus to a prime mover and a cutting means to cut through a bale containing fodder, the apparatus characterised in that the cutting means is operable to retain the bale against a stop member so that the bale is prevented from moving under force of gravity away from the stop member by the cutting means, and the cutting means is further operable to cut through the bale such that the fodder is discharged from the bale and any bale covering materials are retained by the apparatus.

The present invention eliminates the need to separately remove the wrapping materials and then split the bale, which alleviates the aforementioned problems.

In another embodiment of the invention, the bale is supported substantially by the cutting means during cutting.

In another embodiment of the invention, the cutting means is operable to move toward the stop member as the bale is cut and to stop at a point adjacent the stop member.

In another embodiment of the invention, the movement of the cutting means stops after a leading portion of the cutting means penetrates a receiver of the stop member.

In another embodiment of the invention, the receiver is a channel in the stop member.

In another embodiment of the invention, the cutting means comprises a hydraulically operable cutter pivotally mounted on and movable on the apparatus.

In another embodiment of the invention, the hydraulically operable cutter comprises a pair of pivotally mounted arms and a transversely disposed knife member.

In another embodiment of the invention, the knife member includes a plurality of blades for cutting the covering materials and the fodder.

In another embodiment of the invention, the cutting means is operable to commence the cutting operation at the base of the bale and is movable upwardly through the bale, so that at the conclusion of the cutting operation, the cutting means is at the uppermost point of its travel and cooperates with the stop member in retaining the bale covering materials so that the fodder is dispensed without the covering materials being dispensed with the fodder.

In another embodiment of the invention, the cutting means is movable arcuately through the bale to cut the fodder and the covering materials.

In another embodiment of the invention, the apparatus further comprises gripping means operable to grab and hold the bale covering materials.

In another embodiment of the invention, the gripping means is located at or adjacent the stop member of the apparatus so that when the bale is retained against the stop member the gripping means grabs the covering materials.

In another embodiment of the invention, the gripping means comprises a pair of clamps which are hydraulically operable to engage with the covering materials together with knife or blade members of the cutting means.

In another embodiment of the invention, the cutting means is movable towards and between the pair of clamps.

In another embodiment of the invention, the clamps have a longitudinal length which is substantially the same as the longitudinal length of the cutting means.

In another embodiment of the invention, the apparatus further comprises a generally curved frame structure and in which the stop member and cutting means is provided on the frame.

In another embodiment of the invention, the apparatus further comprises a plurality of tines which project substantially orthogonally from the frame structure.

In another embodiment of the invention, the frame structure is pivotally coupled to the prime mover.

In another embodiment of the invention, there is provided a prime mover coupled to such a bale cutting apparatus.

Accordingly, there is also provided a method for cutting a bale containing fodder, the method characterised by the steps of operating a cutting means to retain the bale against a stop member so that the bale is prevented from moving under force of gravity away from the stop member by the cutting means, and then performing the further step of operating the cutting means to cut through the bale such that the fodder is discharged from the bale and any bale covering materials are retained by the apparatus.

In another embodiment of the invention, the method comprises the further step of operating the cutting means so that the bale is substantially supported by the cutting means during cutting.

In another embodiment of the invention, the method comprises the further step of operating the cutting means so that it moves toward the stop member as the bale is cut and then stops at a point adjacent the stop member.

In another embodiment of the invention, the method comprises the further step of operating the cutting means to commence the cutting operation at the base of the bale so that during cutting it is movable upwardly through the bale, so that at the conclusion of the cutting operation, the cutting means is at the uppermost point of its travel and cooperates with the stop member in retaining the covering materials so that the fodder is dispensed without the covering materials being dispensed with the fodder.

In another embodiment of the invention, the method comprises the further step of moving the bale cutting means arcuately through the bale to cut the fodder and the covering materials.

In another embodiment of the invention, the method comprises the further step of operating gripping means to grab and hold the bale covering materials during cutting by the cutting means.

In another embodiment of the invention, the method comprises the further step of locating the gripping means at or adjacent the stop member so that when the bale is retained against the stop member the gripping means grabs the covering materials.

In another embodiment of the invention, the method comprises the further step of operating a pair of hydraulically operable clamps of the gripping means to engage with the covering materials together with knife or blade members of the cutting means.

In another embodiment of the invention, the method comprises the further step of moving the cutting means towards and between the pair of clamps.

In another embodiment of the invention, the method comprises the further step of mounting the stop member and the cutting means to a generally curved frame structure. In another embodiment of the invention, the method comprises the further step of pivotally coupling the generally curved frame structure to a prime mover.

In a further embodiment there is provided a bale cutting apparatus of the type comprising attachment means for coupling the apparatus to a prime mover and a cutting means to cut through a bale containing fodder, the apparatus characterised in that the cutting means has an upwardly directing cutting edge operable to retain the bale against a stop member and to cut through the bale such that the fodder is discharged from the bale.

In another embodiment of the invention, the bale is supported substantially by the cutting means during cutting.

In another embodiment of the invention, the cutting means is operable to move toward the stop member as the bale is cut and to stop at a point adjacent the stop member.

In another embodiment of the invention, the movement of the cutting means stops after a leading portion of the cutting means penetrates a receiver of the stop member.

In another embodiment of the invention, the receiver is a channel in the stop member.

In another embodiment of the invention, the cutting means comprises a hydraulically operable cutter pivotally mounted on and movable on the apparatus.

In another embodiment of the invention, the hydraulically operable cutter comprises a pair of pivotally mounted arms and a transversely disposed knife member.

In another embodiment of the invention, the knife member includes a plurality of blades for cutting the covering materials and the fodder.

In another embodiment of the invention, the cutting means is operable to commence the cutting operation at the base of the bale and is movable upwardly through the bale, so that at the conclusion of the cutting operation, the cutting means is at the uppermost point of its travel and cooperates with the stop member in retaining bale covering materials so that the fodder in the bale is dispensed without the covering materials being dispensed with the fodder.

In another embodiment of the invention, the cutting means is movable arcuately through the bale to cut the fodder and any covering materials.

In another embodiment of the invention, the apparatus further comprises gripping means operable to grab and hold bale covering materials.

In another embodiment of the invention, the gripping means is located at or adjacent the stop member of the apparatus so that when the bale is retained against the stop member the gripping means grabs the covering materials.

In another embodiment of the invention, the gripping means comprises a pair of clamps which are hydraulically operable to engage with the covering materials together with knife or blade members of the cutting means.

In another embodiment of the invention, the cutting means is movable towards and between the pair of clamps.

In another embodiment of the invention, the clamps have a longitudinal length which is substantially the same as the longitudinal length of the cutting means.

In another embodiment of the invention, the apparatus further comprises a generally curved frame structure and in which the stop member and cutting means is provided on the frame.

In another embodiment of the invention, the apparatus further comprises a plurality of tines which project substantially orthogonally from the frame structure.

In another embodiment of the invention, the frame structure is pivotally coupled to the prime mover.

In another embodiment of the invention, there is provided a prime mover coupled to such a bale cutting apparatus.

In such a further embodiment there is also provided a method for cutting a bale containing fodder, the method characterised by the steps of operating a cutting means having an upwardly directing cutting edge to retain the bale against a stop member, and cutting through the bale such that the fodder is discharged from the bale.

In another embodiment of the invention, the method comprises the further step of operating the cutting means so that the bale is substantially supported by the cutting means during cutting.

In another embodiment of the invention, the method comprises the further step of operating the cutting means so that it moves toward the stop member as the bale is cut and then stops at a point adjacent the stop member.

In another embodiment of the invention, the method comprises the further step of operating the cutting means to commence the cutting operation at the base of the bale so that during cutting it is movable upwardly through the bale, so that at the conclusion of the cutting operation, the cutting means is at the uppermost point of its travel and cooperates with the stop member in retaining bale covering materials so that the fodder is dispensed without the covering materials being dispensed with the fodder.

In another embodiment of the invention, the method comprises the further step of moving the bale cutting means arcuately through the bale to cut the fodder and bale covering materials.

In another embodiment of the invention, the method comprises the further step of operating gripping means to grab and hold bale covering materials during cutting by the cutting means.

In another embodiment of the invention, the method comprises the further step of locating the gripping means at or adjacent the stop member so that when the bale is retained against the stop member the gripping means grabs the covering materials.

In another embodiment of the invention, the method comprises the further step of operating a pair of hydraulically operable clamps of the gripping means to engage with the covering materials together with knife or blade members of the cutting means.

In another embodiment of the invention, the method comprises the further step of moving the cutting means towards and between the pair of clamps.

In another embodiment of the invention, the method comprises the further step of mounting the stop member and the cutting means to a generally curved frame structure.

In another embodiment of the invention, the method comprises the further step of pivotally coupling the generally curved frame structure to a prime mover.

In a still further embodiment of the invention, there is provided a bale cutting apparatus of the type comprising attachment means for coupling the apparatus to a prime mover and a cutting means to cut through a bale containing fodder, the apparatus characterised in that the cutting means is operable to retain the bale against a stop member so that the bale is prevented from moving under force of gravity away from the stop member by the cutting means, and the cutting means is further operable to cut through the bale such that the fodder is discharged from the bale and any bale covering materials are retained substantially at or adjacent the stop member.

In another embodiment of the invention, the bale is supported substantially by the cutting means during cutting.

In another embodiment of the invention, the cutting means is operable to move toward the stop member as the bale is cut and to stop at a point adjacent the stop member.

In another embodiment of the invention, the movement of the cutting means stops after a leading portion of the cutting means penetrates a receiver of the stop member.

In another embodiment of the invention, the receiver is a channel in the stop member.

In another embodiment of the invention, the cutting means comprises a hydraulically operable cutter pivotally mounted on and movable on the apparatus.

In another embodiment of the invention, the hydraulically operable cutter comprises a pair of pivotally mounted arms and a transversely disposed knife member.

In another embodiment of the invention, the knife member includes a plurality of blades for cutting the bale.

In another embodiment of the invention, the cutting means is operable to commence the cutting operation at the base of the bale and is movable upwardly through the bale, so that at the conclusion of the cutting operation, the cutting means is at the uppermost point of its travel and cooperates with the stop member in retaining the bale covering materials so that the fodder is dispensed without the covering materials being dispensed with the fodder.

In another embodiment of the invention, the cutting means is movable arcuately through the bale to cut the fodder and the bale covering materials.

In another embodiment of the invention, the apparatus further comprises gripping means operable to grab and hold the bale covering materials.

In another embodiment of the invention, the gripping means is located at or adjacent the stop member of the apparatus so that when the bale is retained between the cutting means and the stop member the gripping means grabs the covering materials.

In another embodiment of the invention, the gripping means comprises a pair of clamps which are hydraulically operable to engage with the covering materials together with knife or blade members of the cutting means.

In another embodiment of the invention, the cutting means is movable towards and between the pair of clamps.

In another embodiment of the invention, the clamps have a longitudinal length which is substantially the same as the longitudinal length of the cutting means.

In another embodiment of the invention, the apparatus further comprises a generally curved frame structure and in which the stop member and cutting means is provided on the frame.

In another embodiment of the invention, the apparatus further comprises a plurality of tines which project substantially orthogonally from the frame structure.

In another embodiment of the invention, the frame structure is pivotally coupled to the prime mover.

In another embodiment of the invention, there is provided a prime mover coupled to such a bale cutting apparatus.

In such a further embodiment there is also provided a method for cutting a bale containing fodder, the method characterised by the steps of operating a cutting means to retain the bale against a stop member so that the bale is prevented from moving under force of gravity away from the stop member by the cutting means, and then performing the further step of operating the cutting means to cut through the bale so that the fodder is discharged from the bale and any bale covering materials are retained substantially at or adjacent the stop member.

In another embodiment of the invention, the method comprises the further step of operating the cutting means so that the bale is substantially supported by the cutting means during cutting.

In another embodiment of the invention, the method comprises the further step of operating the cutting means so that it moves toward the stop member as the bale is cut and then stops at a point adjacent the stop member.

In another embodiment of the invention, the method comprises the further step of operating the cutting means to commence the cutting operation at the base of the bale so that during cutting it is movable upwardly through the bale, so that at the conclusion of the cutting operation, the cutting means is at the uppermost point of its travel and cooperates with the stop member in retaining the bale covering materials so that the fodder is dispensed without the covering materials being dispensed with the fodder.

In another embodiment of the invention, the method comprises the further step of moving the bale cutting means arcuately through the bale to cut the fodder and the bale covering materials.

In another embodiment of the invention, the method comprises the further step of operating gripping means to grab and hold bale covering materials during cutting by the cutting means.

In another embodiment of the invention, the method comprises the further step of locating the gripping means at or adjacent the stop member so that when the bale is retained between the cutting means and the stop member the gripping means grabs the bale covering materials.

In another embodiment of the invention, the method comprises the further step of operating a pair of hydraulically operable clamps of the gripping means to engage with the bale covering materials together with knife or blade members of the cutting means.

In another embodiment of the invention, the method comprises the further step of moving the cutting means towards and between the pair of clamps.

In another embodiment of the invention, the method comprises the further step of mounting the stop member and the cutting means to a generally curved frame structure.

In another embodiment of the invention, the method comprises the further step of pivotally coupling the generally curved frame structure to a prime mover.

The invention will hereinafter be more particularly described with reference to the accompanying drawings, which show by way of example only, one embodiment of a bale cutting apparatus according to the invention. In the drawings:

FIGS. 11a and 11b are detailed side diagrammatic views of clamps of a gripping means grabbing covering materials in which the bale is wrapped;

Figure 1:
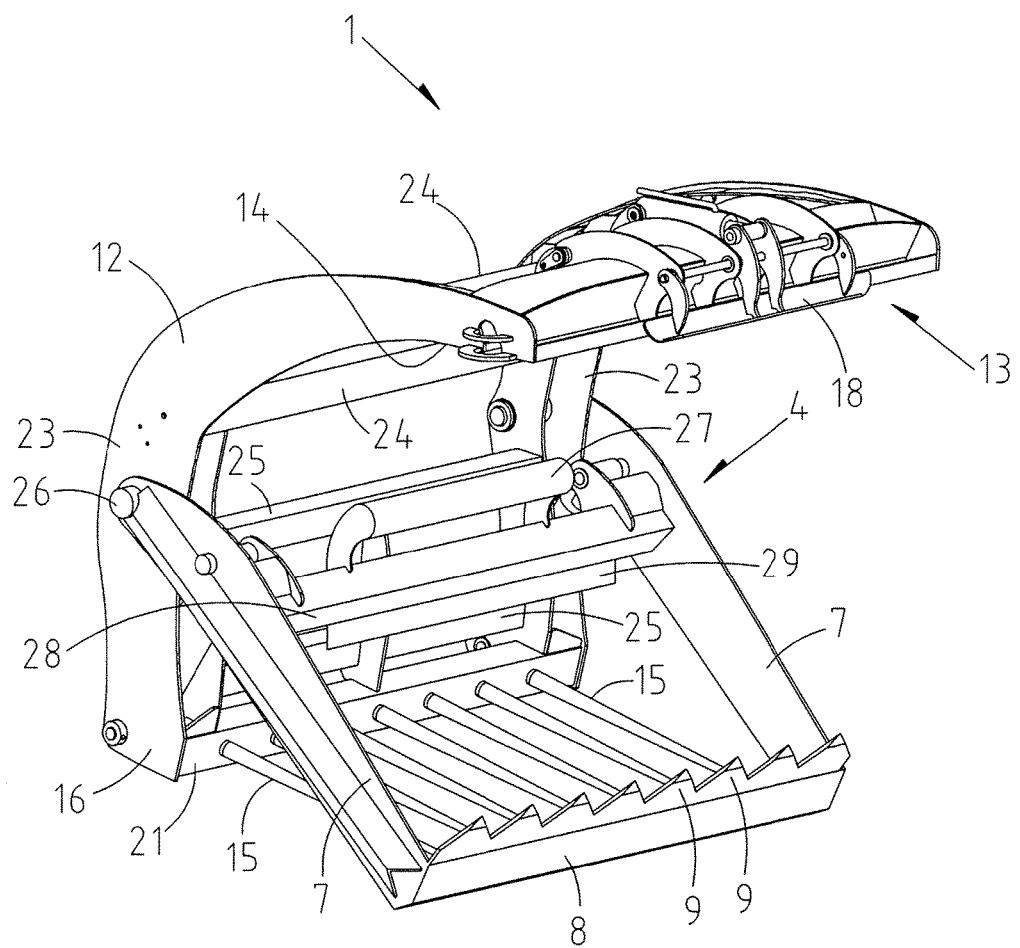
FIG. 1 is a perspective view of a bale cutting apparatus shown in an open position according to the present invention.
Figure 2:
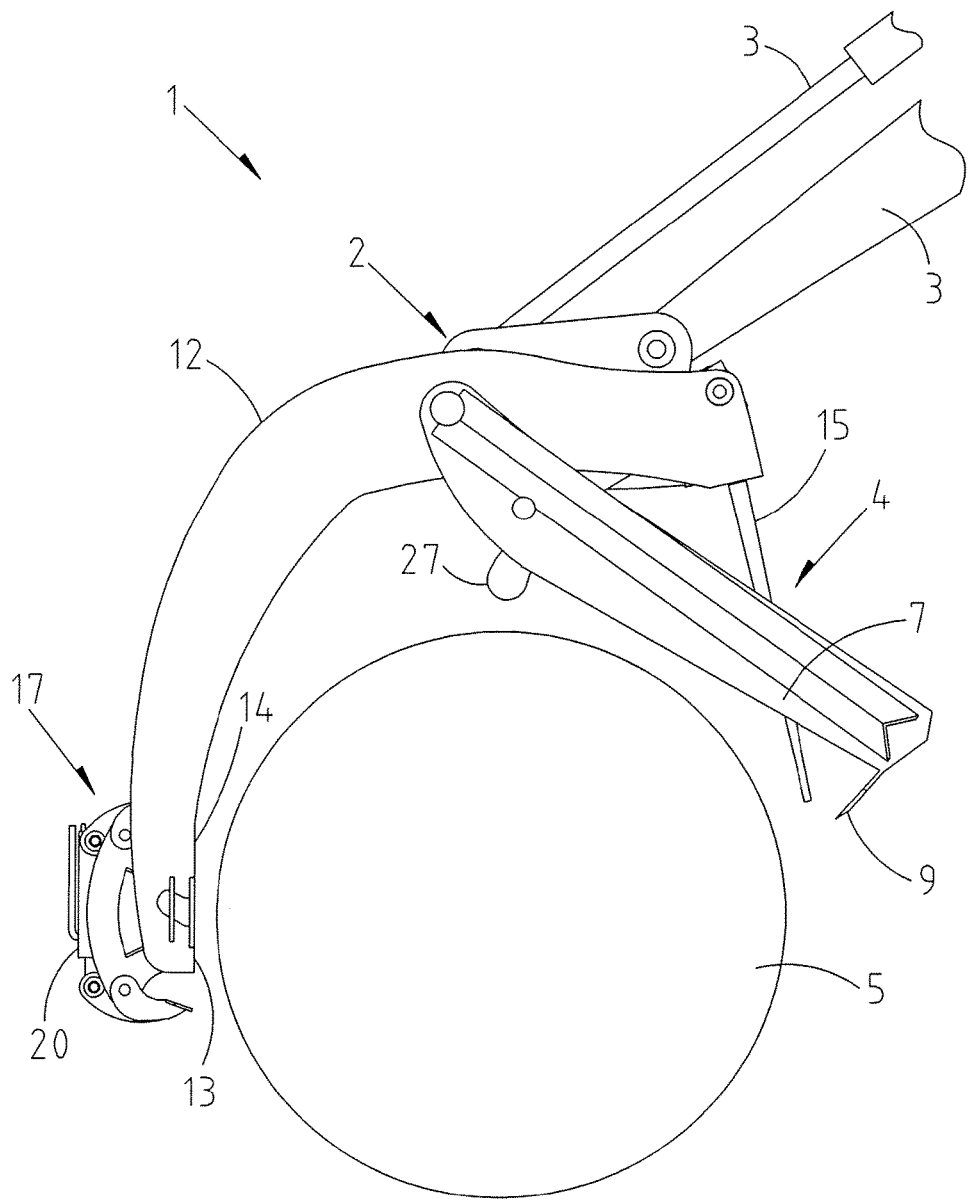
FIG. 2 is a side diagrammatic of the bale cutting apparatus of FIG. 1 shown in an open position about to engage a wrapped bale of fodder.
Figure 3:
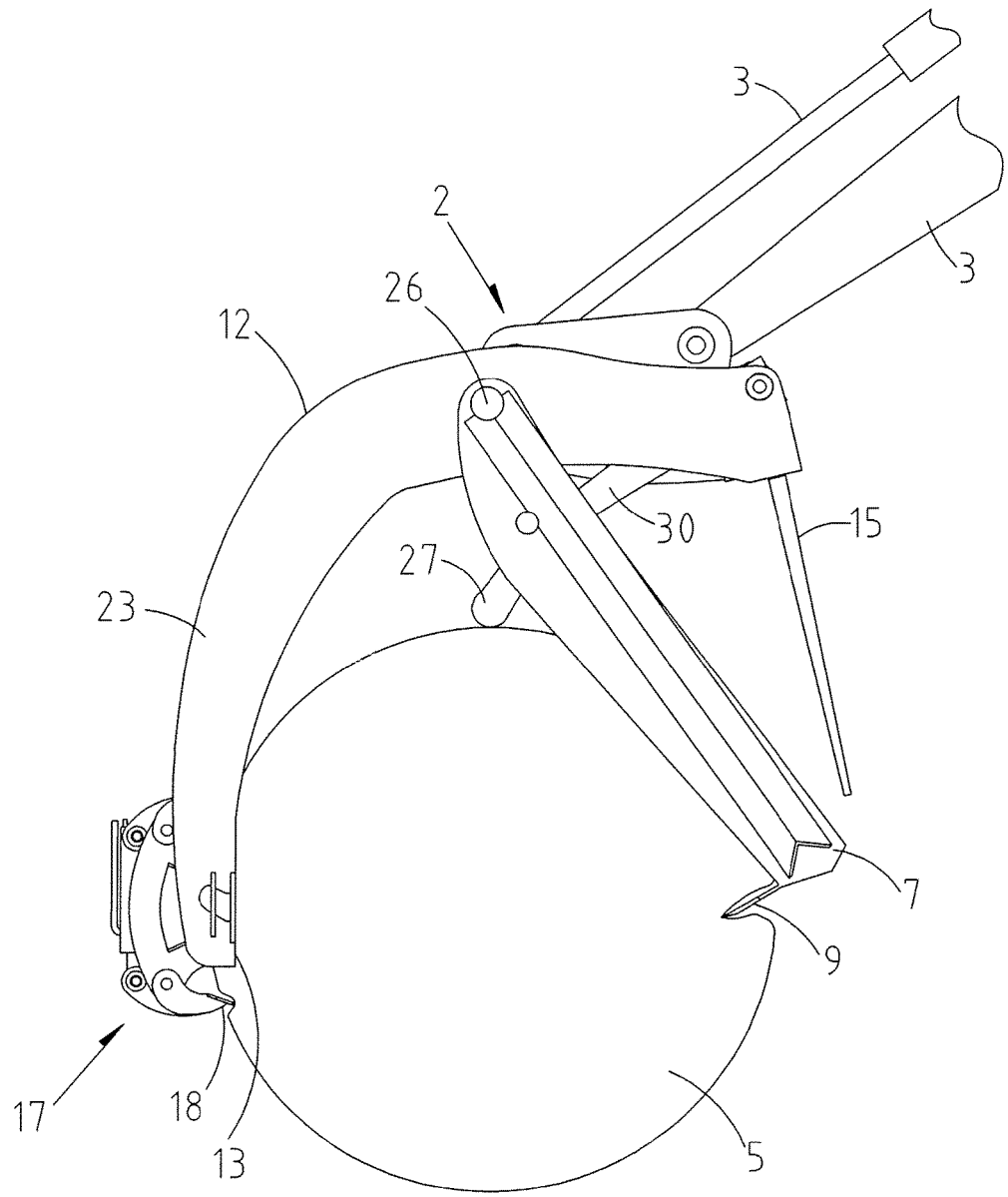
FIG. 3 is a side diagrammatic of the bale cutting apparatus of FIG. 1 engaging with the wrapped bale of fodder.
Figure 4:
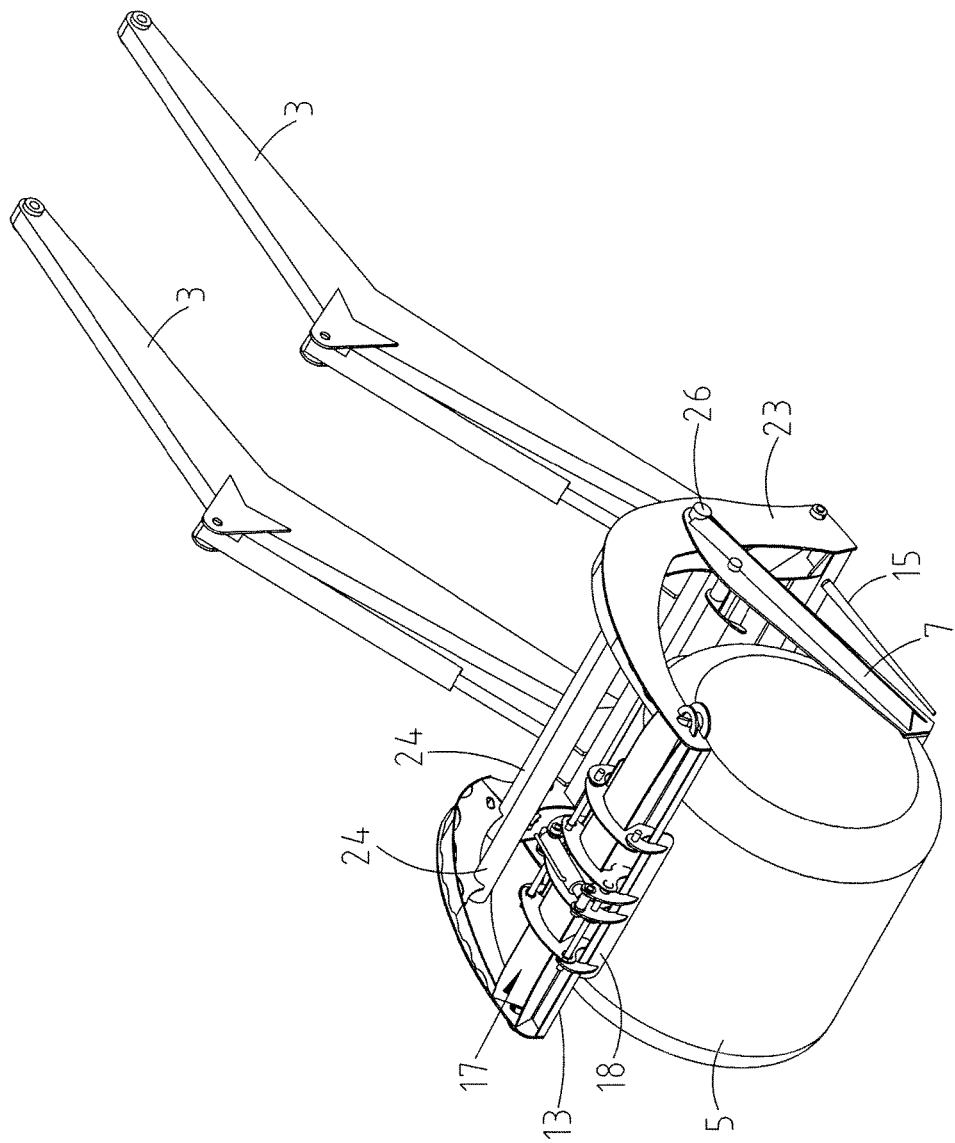
FIG. 4 is a perspective view of the bale cutting apparatus shown in FIG. 1 coupled to the arms of a prime mover and about to begin a cutting operation.
Figure 5:
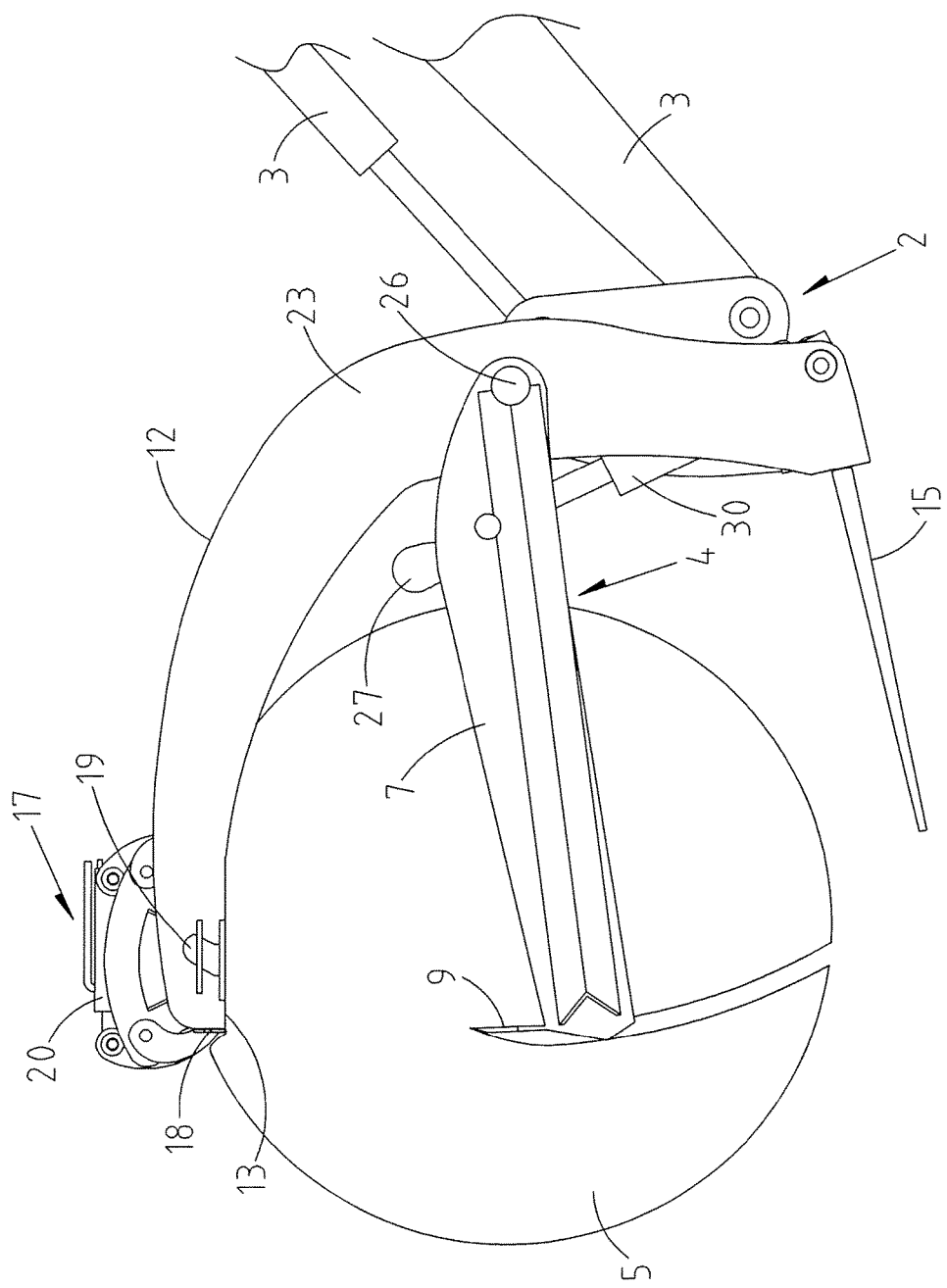
FIG. 5 is a side diagrammatic of the bale cutting apparatus in which a lower part of the bale is being penetrated.
Figure 6:
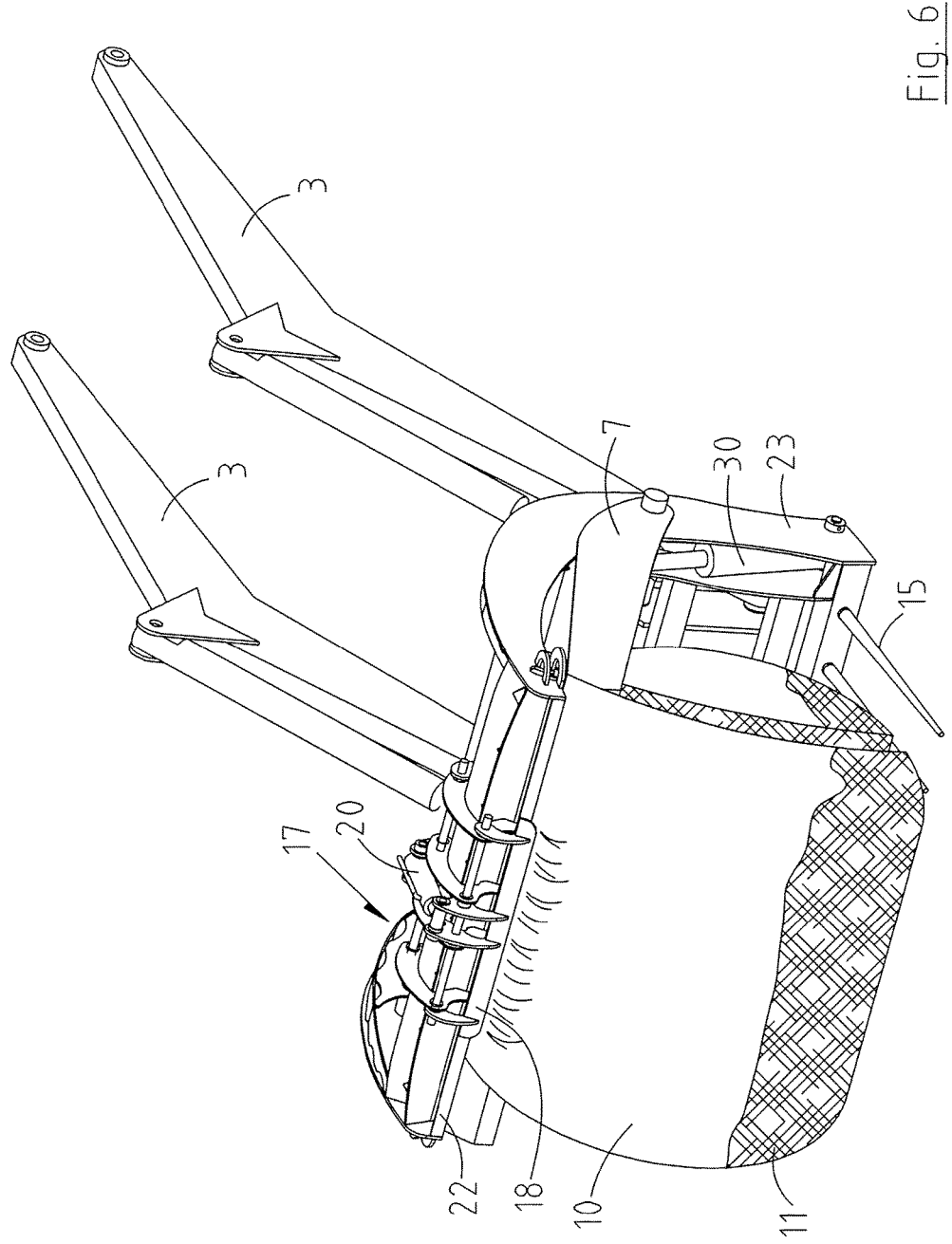
FIG. 6 is a perspective view showing the bale cutting apparatus coupled to a prime mover and penetrating through a bale of fodder.

Referring to the drawings, and initially to FIGS. 1 to 10, there is shown a bale cutting apparatus, generally indicated by the reference numeral 1 of the type comprising attachment means, indicated generally by the reference numeral 2, for coupling the apparatus 1 to a prime mover (no shown). In the instance shown the apparatus 1 is coupled to two arms 3 of the prime mover, but this should not be seen as limiting since it would also be possible to adapt the attachment means 2 so that it will couple with a three-point linkage or any other suitable connection system as required or as desired.

Also shown is a cutting means, indicated generally by the reference numeral 4, being operable to cut through a bale 5 containing fodder 11. In the following description the bale 5 will be described as a bale of fodder 11 which is wrapped in covering materials 10 (see FIGS. 9 and 10), such as plastics coverings, which serve to hold the bale together and preserve the fodder from the air therefore promoting anaerobic fermentation, which allows the fodder to be stored for winter feeding. However, it will be appreciated that the present invention may also be used to cut bales 5 which have no such covering materials 10 around the fodder 11.

The cutting means 4 is hydraulically operable and pivotally mounted and movable on the apparatus 1. The cutting means 4 comprises of a cutter having a pair of arms 7 which are pivotally mounted to the apparatus 1 and a transversely disposed knife member 8 which includes a plurality of blades 9 for cutting the bale 5 including the covering materials 10 and the fodder 11.

The apparatus 1 further comprises a stop member, indicated generally by the reference numeral 13, which is provided as a bottom facing surface 14 at the top end of a generally curved frame structure 12. The curved frame 12 has a pair of curved side members 23 which are connected together by round cross members 24 and square shaped cross members 24 which give rigidity to the entire structure of the frame 12. A plurality of tines 15 project substantially orthogonally from the bottom end 16 of the frame structure 12. The tines 15 have ends of which are bolted or welded in position to a box section 21 at the lower end of the frame 12. The tines 15 may be used for transporting bales 5, such as by piercing into them or being used to nudge the bales 5 into a desired position. The cutting means 4 is also shown pivotally mounted to the frame 12 and so that the pair of hydraulic rams are used to move the cutting means 4 up and down about the pivot point 26 of the frame 12. A fixed bar 27 and a back panel 29 are also provided to stop the bale from moving too far toward the rear of the apparatus 1. An angled box section 28 is also provided to apply a pressure to the covering materials 10 during cutting to assist in moving the materials 10 away from the bale 5.

Figure 12:
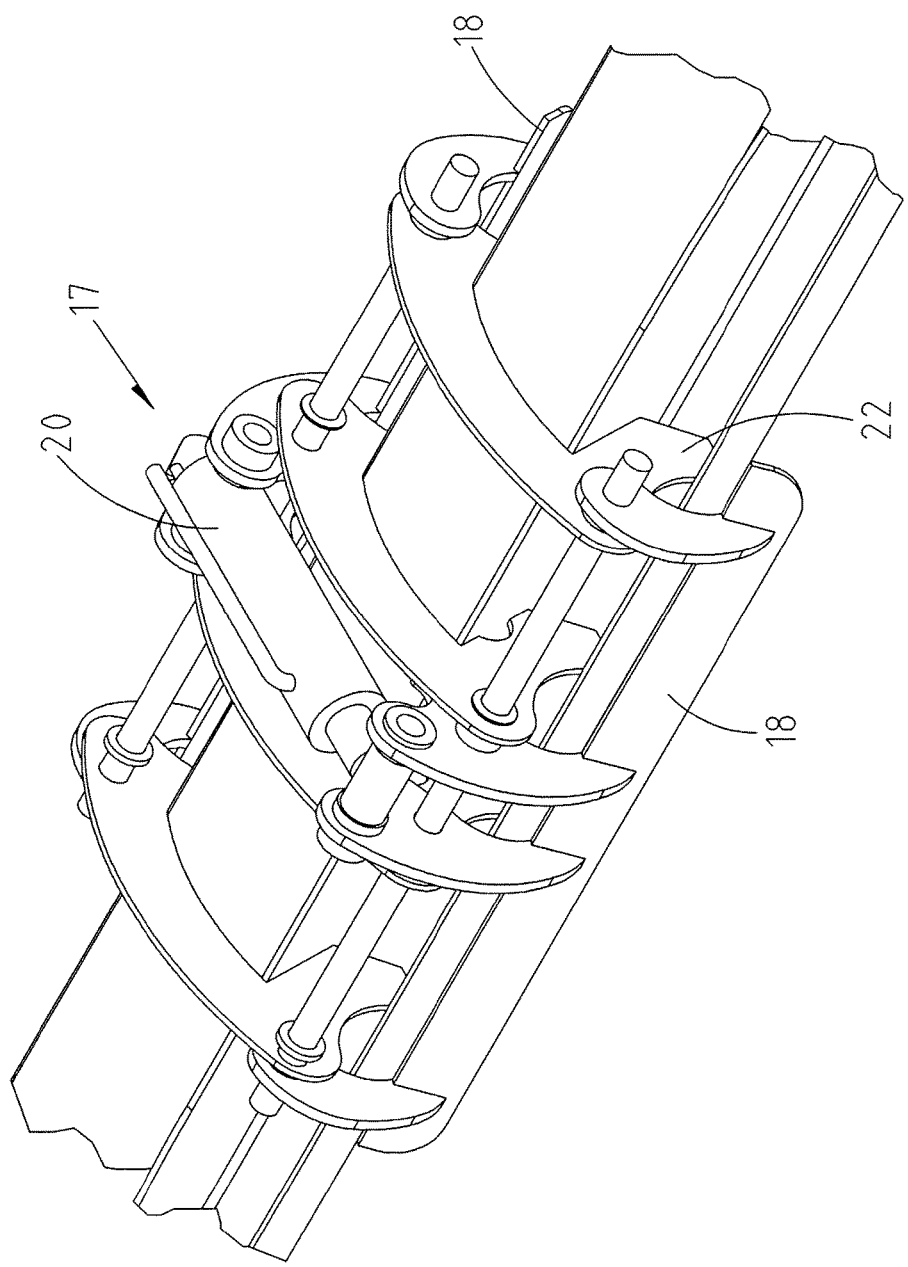
FIG. 12 is a perspective view of the clamps shown in FIGS. 11a and 11b.

FIGS. 11 and 12 show the operation of gripping means 17 of the apparatus 1 which is operable to grab and hold the bale covering materials 10 wrapping the fodder 11 during cutting. In the instance shown, the gripping means 17 is located at or adjacent the stop member 13 of the apparatus so that when the bale 5 is retained against the stop member 13 the gripping means 17 grabs or pinches the covering materials 10. The gripping means 17 comprises one or more pairs of clamps 18 which are hydraulically operable to engage with and grab the covering materials 10. The clamps 18 are movable towards and away from a clamp receiver 22 by a hydraulic ram 20. By this action, the covering material 10 of the bale 5 is held by the clamp receiver 22 in conjunction with the clamps 18 leaning against the outside of the surface of the clamp receiver 22. The clamps 18 may have a length which is substantially the same as the length of the knife member 8 of the cutting means 4. Although the gripping means 17 is shown being positioned at or adjacent the stop member 13 it will be understood that it may be also be placed to good effect at or adjacent any position on the frame structure 12 so that it can successfully grip the covering materials 10 around the bale 4. For example, the gripping means 17 may be located along the back of the frame structure 12, such as on one or other of the section members 24, 25. Accordingly, reference to the gripping means 17 being provided at or adjacent the stop member 13 should not be seen as limiting.

Figure 7:
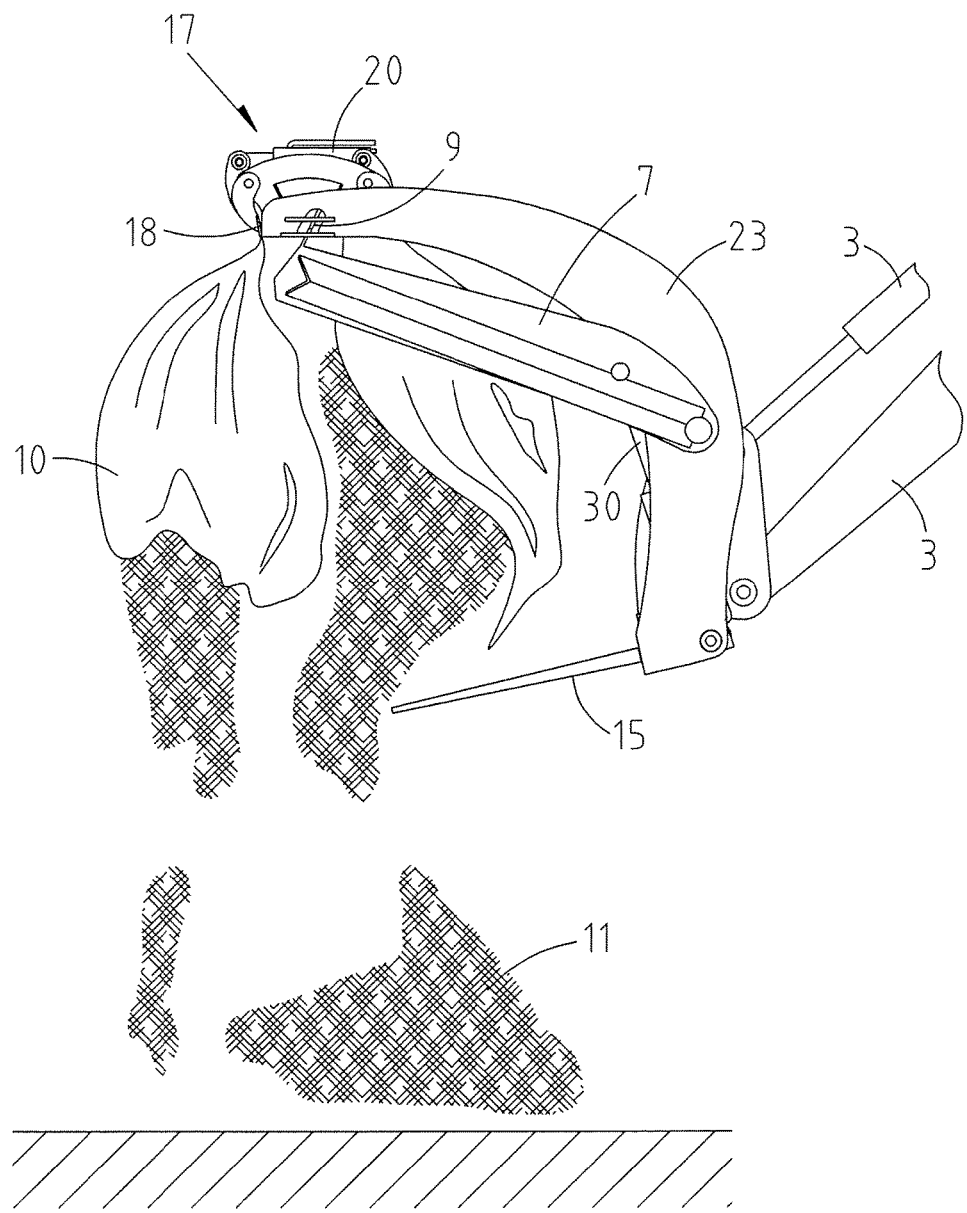
FIG. 7 is a side diagrammatic showing the bale cutting apparatus penetrating further into the bale and fodder being discharged from the bale.
Figure 8:
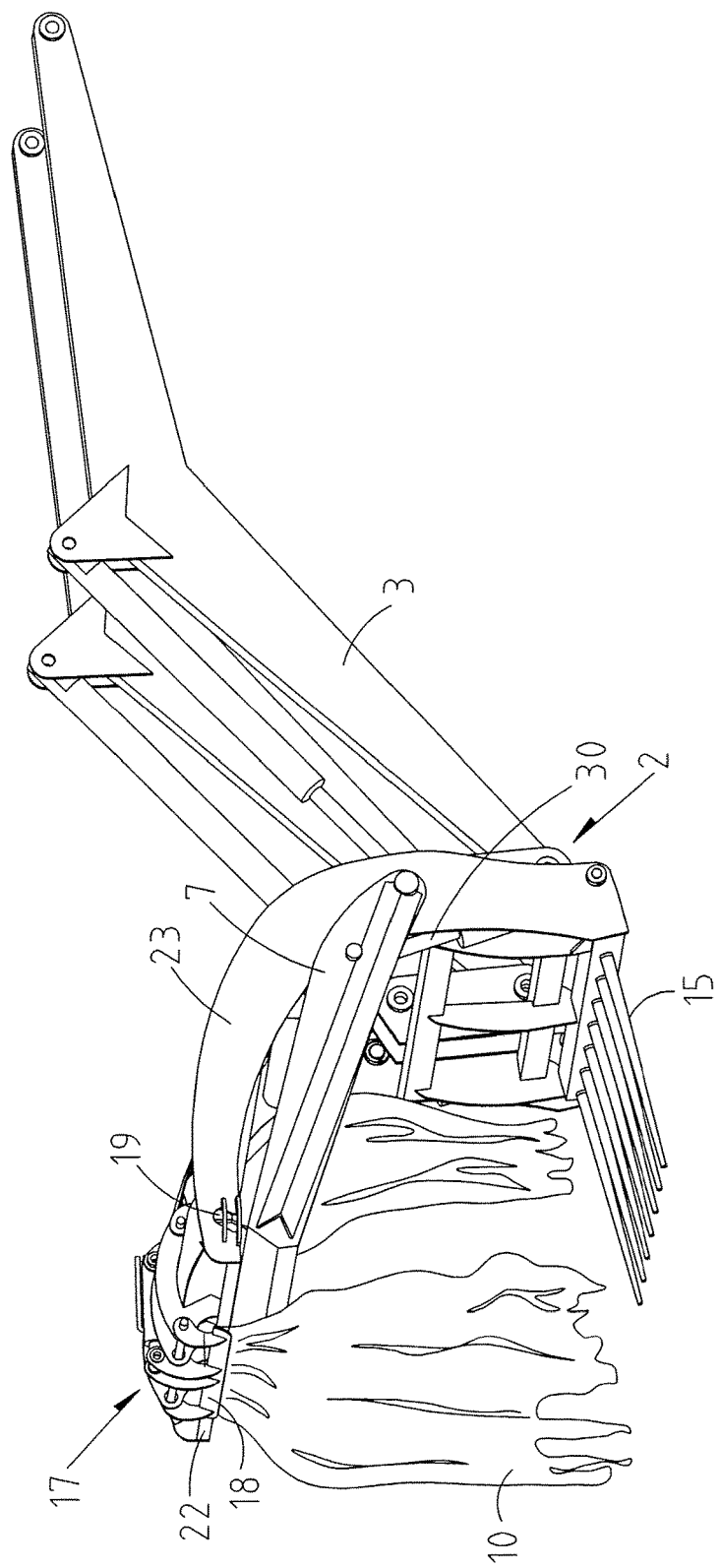
FIG. 8 is a perspective view showing the bale cutting apparatus completely penetrated through the bale with all fodder discharged with the covering materials retained by the gripping means.

As shown in FIGS. 3 to 9, in operation, the cutting means 4 is operable to push against and so retain the bale 5 against the stop member 13. Thus operating the cutting means 4 will push against the bale 5 and urge the bale into a secure engagement with the stop member 13 so that the bale 5 is able to be securely held between the two contact points of the stop member 13 and the cutting means 4. As shown in FIG. 7, the bale 5 may be lifted off the ground by the cooperation of the stop member 13 and the cutting means 4 which form a mouth to grip the bale 5 sufficiently so that the bale may optionally be lifted of the ground and prevented from moving under force of gravity away from the stop member 13 by the cutting means 4.

The cutting means 4 is operable to cut through the bale 5 such that the fodder 11 is discharged from the bale 5 and any bale covering materials 10 are separated and retained by the apparatus 1. Before or whilst cutting, the apparatus 1 may be pivoted or oriented relative to the ground such that the blades 9 of the cutting means 4 are upwardly directed and the bale 5 is thereby supported substantially by the cutting means 4 during cutting. In such a configuration, the cutting means 4 is operable to commence the cutting operation at the base of the bale 5 and is movable upwardly through the bale 5, so that at the conclusion of the cutting operation, the cutting means 4 is at the uppermost point of its travel and cooperates with the stop member 13 in retaining the covering materials 10 so that the fodder 11 is dispensed without the covering materials 10 being dispensed with the fodder 11. As shown, the cutting means 4 is movable arcuately through the bale 5 to cut the fodder 11 and the covering materials 10. When the cutting means 4 applied pressure to the bale 5 the force of the cutting action forces the bale 5 against the stop member 13 and when this happens it causes the top of the bale 5 to change shape and deform which forces the bale coverings 10 into the gripping means 17. In particular, the covering materials 10 are urged into a channel between the clamps 18 and the clamp receivers 22.

It will however be understood that the apparatus 1 may be oriented or appropriately pivoted relative to the prime mover to which it is attached such that a cutting operation may also be commenced with the cutting means 4 cutting through a side or top region of the bale 5. This would present the cutting means 4 as having a transversely or downwardly directed cutting edge or blade 9. The cutting means 4 is operable to move toward the stop member 13 as the bale is cut and to stop at a point adjacent the stop member 13. The movement of the cutting means 4 effectively stopping after a leading portion of the cutting means 4 penetrates a stop receiver formed as a channel 19 of the stop member 13.

Figure 9:
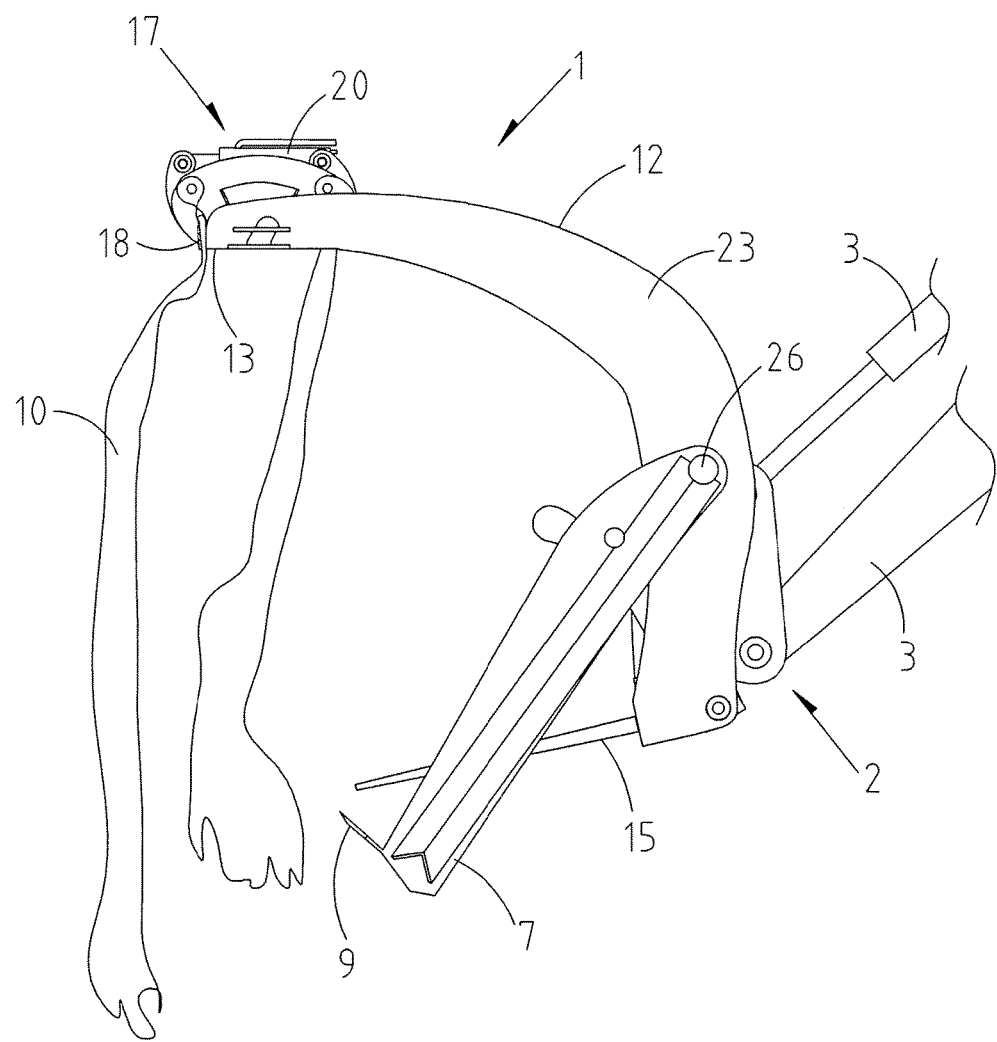
FIG. 9 is a side diagrammatic view showing the bale cutting apparatus holding covering materials separated from the discharged fodder.
Figure 10:
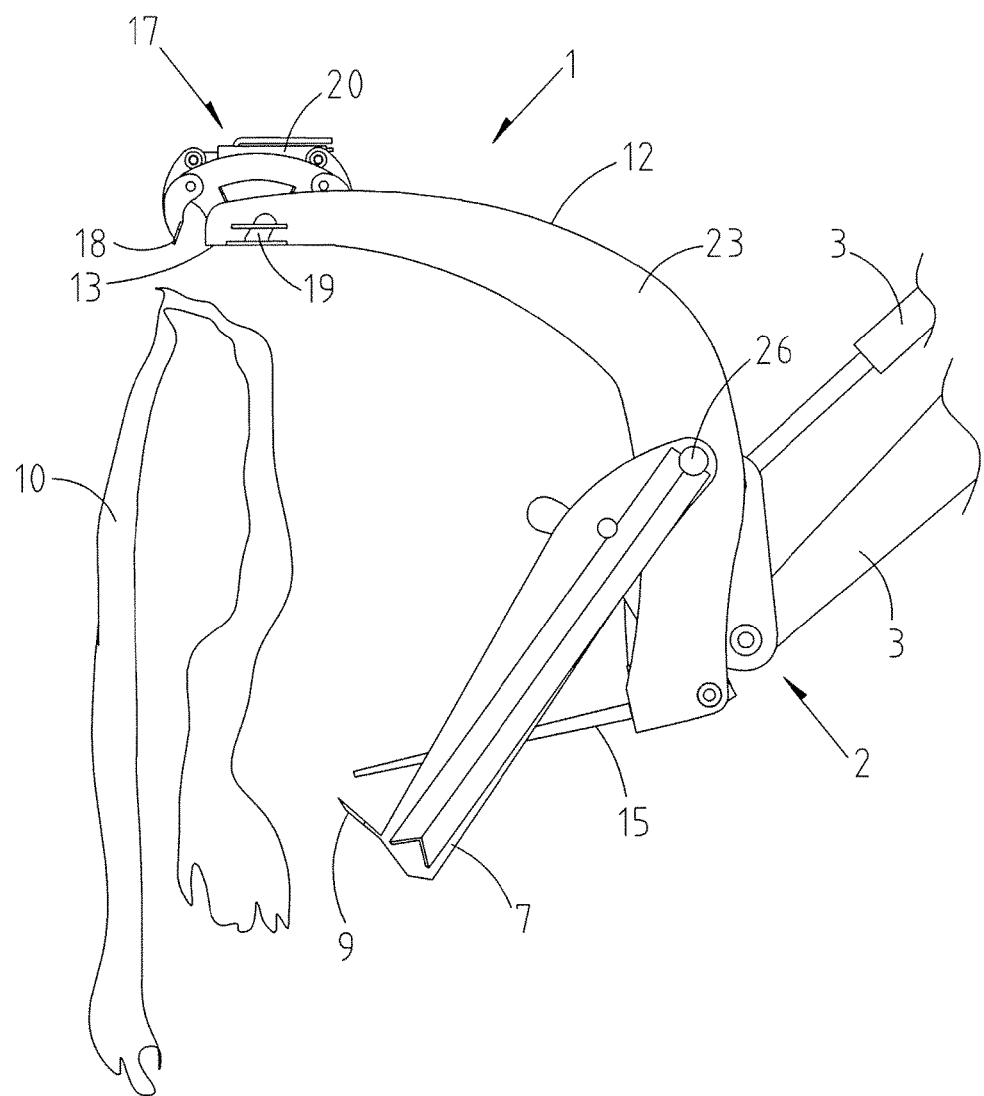
FIG. 10 is a side diagrammatic view showing the bale cutting apparatus releasing covering materials separated from the discharged fodder.

After cutting the bale 5 such that the fodder 11 has been discharged the cutting means 4 is then moved away from the stop member 13, as shown in FIG. 9. The clamps 18 of the gripping means 17 may then, when required, be released by the hydraulic ram 20 so that the covering materials 10, which are by now fully separated from the fodder 11, may be released from the bale cutting apparatus 1. The bale covering materials 10 may be retained in different ways by the apparatus 1. In most instances the coverings 10 may be retained by appropriate activation of the clamps 18 of the gripping means 17. However, in an alternative embodiment, the covering materials 10 may instead be retained on the cutting blades 9 where a gripping means 17 has not been provided or is not being used with the apparatus 1. In such an arrangement the covering materials 10 would be seen resting on the blades 9 as the cutting means 4 is pivoted away from the stop member 13.

Figure 13:
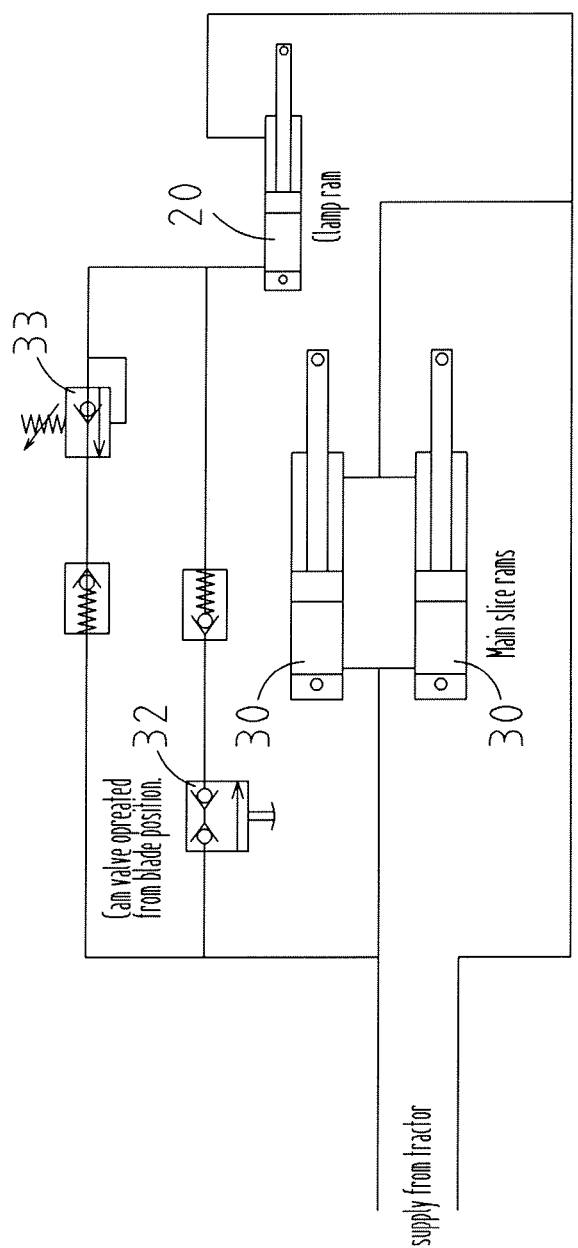
FIG. 13 is a schematic representation of a hydraulic circuit used to power the bale cutting apparatus.

A level of co-ordination of the clamps 18 of the gripping means 17 with the cutting means 4 may be achieved by using the hydraulic unit shown in FIG. 13. The hydraulic rams 30 which actuate the arms 7 of the cutting means 4, and the hydraulic ram 20 which operates the clamps 18 are supplied from a prime mover, such as a tractor or a digger. The clamps 18 are operated when cam valve opens 32, and such operation may optionally be determined by the blade 9 position of the cutting means 4 as it is moved toward or through the bale 5. For example, the clamps 18 of the gripping means may be actuated when the cutting means 4 is about half way through cutting a bale 5. The valve 32 opens causing the clamps 18 to move against the clamp receiver 22 to thereby grip the covering materials 10 when the cutting means 4 is at some pre-determined point in carrying out a cutting operation. After the bale 5 is cut and fodder 11 discharged the valve 33 may be closed causing the clamps 18 to open and the plastics covering material to be released.

In a further embodiment of the invention, the tines 15 may be adapted so as to be movable so that they can be used to retain the bale 5 against a stop member 13. In such an embodiment the tines 15 are operable with the stop member 13 to thereby grip the bale 5 before the cutting means 4 is used to cut the bale 5.

It is to be understood that the invention is not limited to the specific details described herein which are given by way of example only and that various modifications and alterations are possible without departing from the scope of the invention as defined in the appended claims.

The invention claimed is:

1. A bale cutting apparatus comprising:
    an attachment means for coupling the apparatus to a prime mover,
    an upper stop member, and
    a cutting means to cut through a bale containing fodder, the cutting means having an upwardly directing cutting edge, and being configured to retain the bale against the upper stop member with the cutting means below the upper stop member and being movable upwardly towards the upper stop member to cut through the bale to a location adjacent the upper stop member co-operating with the upper stop member for retaining bale covering materials between the cutting means and the upper stop member, so that the fodder is discharged from the bale without the covering materials.

2. A bale cutting apparatus as claimed in claim 1, in which the cutting means is operable to retain the bale against the upper stop member so that the bale is prevented from moving under force of gravity away from the upper stop member.

3. The bale cutting apparatus as claimed in claim 1, in which the bale is supported by the cutting means during cutting.

4. The bale cutting apparatus as claimed in claim 1, in which the cutting means is operable to stop at a point adjacent the upper stop member.

5. The bale cutting apparatus as claimed in claim 1, in which the movement of the cutting means stops after a leading portion of the cutting means penetrates a receiver of the upper stop member.

6. The bale cutting apparatus as claimed in claim 5, in which the receiver is a channel in the upper stop member.

7. The bale cutting apparatus as claimed in claim 1, in which the cutting means comprises an hydraulically operable cutter pivotally mounted on and movable on the apparatus.

8. The bale cutting apparatus as claimed in claim 7, in which the hydraulically operable cutter comprises a pair of pivotally mounted arms and a transversely disposed knife member.

9. The bale cutting apparatus as claimed in claim 1, in which the cutting means includes a plurality of blades for cutting the covering materials and the fodder.

10. The bale cutting apparatus as claimed in claim 1, in which the cutting means is operable to commence the cutting operation at the base of the bale and is movable upwardly through the bale, so that at the conclusion of the cutting operation, the cutting means is at the uppermost point of its travel co-operating with the upper stop member in retaining the covering materials.

11. The bale cutting apparatus as claimed in claim 1, in which the cutting means is movable arcuately through the bale to cut the fodder and the covering materials.

12. The bale cutting apparatus as claimed in claim 1, further comprising gripping means operable to grab and hold the bale covering materials.

13. The bale cutting apparatus as claimed in claim 12, in which the gripping means is located at or adjacent the upper stop member of the apparatus so that when the bale is retained against the upper stop member the gripping means grabs the covering materials.

14. The bale cutting apparatus as claimed in claim 12, in which the gripping means comprises a pair of clamps which are hydraulically operable to engage with the covering materials together with knife or blade members of the cutting means.

15. The bale cutting apparatus as claimed in claim 14, in which the cutting means is movable towards and between the pair of clamps.

16. The bale cutting apparatus as claimed in claim 14, in which the clamps have a longitudinal length which is the same as the longitudinal length of the cutting means.

17. The bale cutting apparatus as claimed in claim 1, in which the apparatus further comprises a generally curved frame structure and in which the upper stop member and cutting means is provided on the frame.

18. The bale cutting apparatus as claimed in claim 17, in which the apparatus further comprises a plurality of tines which project orthogonally from the frame structure.

19. The bale cutting apparatus as claimed in claim 17, in which the frame structure is pivotally coupled to the prime mover.

20. The bale cutting apparatus as claimed in claim 1, coupled to the prime mover.

21. A bale apparatus comprising:

an attachment means for coupling the apparatus to a prime mover, a stop member, a gripping means located adjacent the stop member operable to grab bale wrapping materials of a bale of fodder, a cutting means movable towards the stop member to cut through the bale and to urge and retain the bale against the stop member so that the bale is prevented from moving under force of gravity away from the stop member, and to force the bale wrapping materials into the gripping means for gripping thereof, so that when the cutting means has cut through the bale, the fodder is discharged from the bale and the bale covering materials are retained at or adjacent the stop member by the gripping means.

* * * * *